(12) United States Patent
Hird

(10) Patent No.: US 10,874,276 B2
(45) Date of Patent: Dec. 29, 2020

(54) PROXIMITY DETECTION

(71) Applicant: BLACK & DECKER INC., New Britain, CT (US)

(72) Inventor: Alex David Hird, Durham (GB)

(73) Assignee: Black & Decker, Inc., New Britain, CT (US)

( * ) Notice: Subject to any disclaimer, the term of this patent is extended or adjusted under 35 U.S.C. 154(b) by 308 days.

(21) Appl. No.: 16/136,583

(22) Filed: Sep. 20, 2018

(65) Prior Publication Data

US 2019/0099051 A1   Apr. 4, 2019

(30) Foreign Application Priority Data

Oct. 3, 2017   (EP) ..................... 17194510

(51) Int. Cl.
| | |
|---|---|
| *A47L 9/28* | (2006.01) |
| *A47L 5/24* | (2006.01) |
| *A47L 5/34* | (2006.01) |
| *A47L 9/24* | (2006.01) |
| *A47L 9/02* | (2006.01) |
| *G01S 17/04* | (2020.01) |

(52) U.S. Cl.
CPC ............. *A47L 9/2852* (2013.01); *A47L 5/24* (2013.01); *A47L 5/34* (2013.01); *A47L 9/02* (2013.01); *A47L 9/244* (2013.01); *A47L 9/246* (2013.01); *A47L 9/248* (2013.01); *A47L 9/2826* (2013.01); *A47L 9/2842* (2013.01); *A47L 9/2857* (2013.01); *G01S 17/04* (2020.01)

(58) Field of Classification Search
CPC ..................................... A47L 9/2805
See application file for complete search history.

(56) References Cited

U.S. PATENT DOCUMENTS

| | | | |
|---|---|---|---|
| 2016/0015228 A1 | 1/2016 | Conrad et al. | |
| 2017/0172362 A1 | 6/2017 | Reimer et al. | |

FOREIGN PATENT DOCUMENTS

| | | |
|---|---|---|
| EP | 2515196 | 10/2012 |
| JP | 2017029523 | 2/2017 |
| WO | WO2014195711 | 12/2017 |

OTHER PUBLICATIONS

EP Search Report dated Mar. 12, 2018, for EP Application No. EP17194510.

*Primary Examiner* — Andrew A Horton
(74) *Attorney, Agent, or Firm* — John Yun

(57) ABSTRACT

A vacuum cleaner comprising: a suction device; an extendable inlet nozzle in fluid communication with the suction device, the extendable inlet nozzle being extendable from a first operable position to a second operable position; a proximity sensor for detecting a surface; and a controller configured to change the suction power of the suction device in dependence on a signal from the proximity sensor and in dependence on the position of the extendable inlet nozzle.

16 Claims, 3 Drawing Sheets

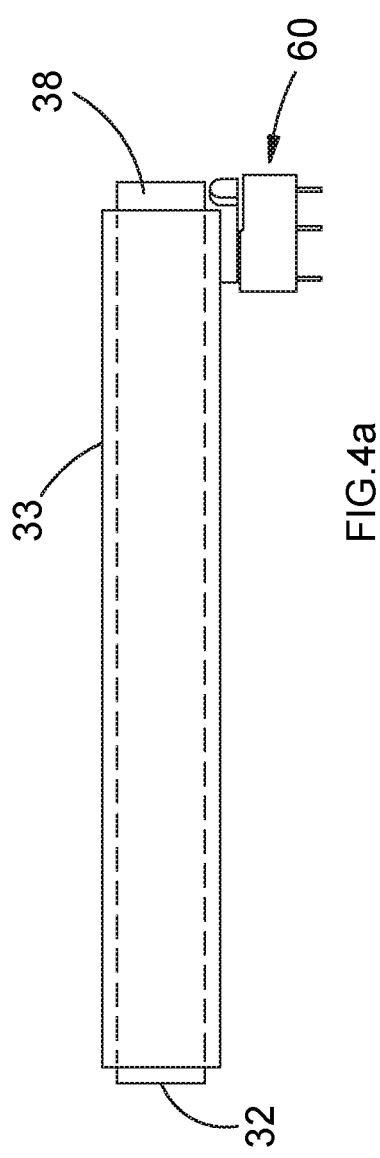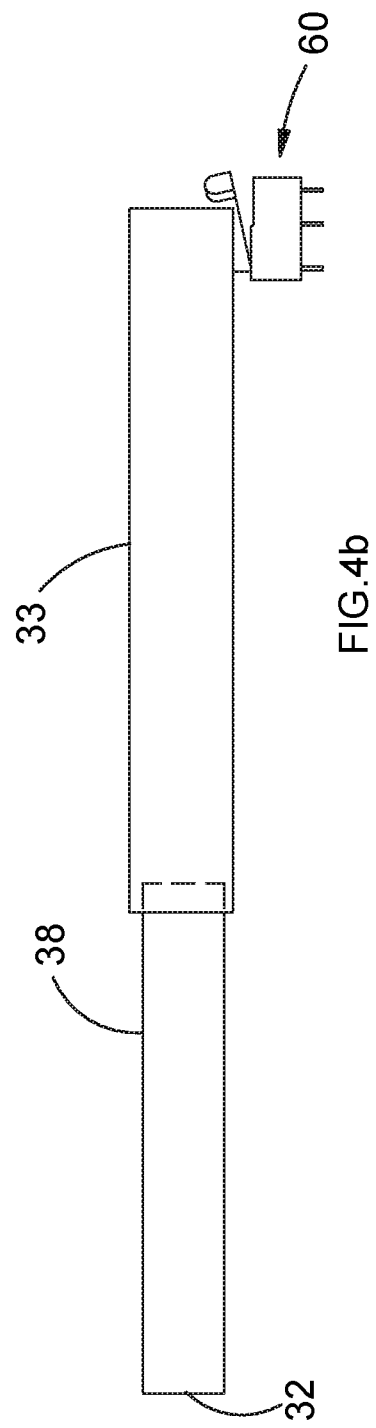

PROXIMITY DETECTION

BACKGROUND OF THE INVENTION

The present invention relates to a vacuum cleaner.

Vacuum cleaners are well known for collecting dust and dirt. Typically, vacuum cleaners are intended for use in a domestic environment, although they also find uses in other environments. Generally vacuum cleaners are electrically powered and comprise an electric motor and a fan connected to an output shaft of the motor, an inlet for dirty air, an outlet for clean air and a collection chamber for dust. A dust filter and/or other separating means (such as cyclones) is located between the inlet and the collection chamber in order to remove the dirt from the dirty air. Electrical power can be provided by a source of mains electricity or by a replaceable and/or rechargeable battery pack.

In recent times there has been a trend for vacuum cleaners to be battery operated because this removes the need for a power cable and allows the user to use the vacuum cleaner remote from sources of mains electricity. Battery operated vacuum cleaners are often smaller handheld devices which also assist in the portability of the vacuum cleaner. For example, a user can use a battery powered handheld vacuum cleaner in a vehicle well away from any sources of mains electricity.

A problem with battery operated vacuum cleaners is that the run-time of the vacuum cleaner is limited by the battery capacity. One way of increasing the run-time is by providing the vacuum cleaner with a battery that has a larger capacity. However, larger capacity batteries tend to be heavier and thus the vacuum cleaner becomes difficult and uncomfortable to use. There is, therefore, a need to increase the run-time of a vacuum cleaner with a limited battery capacity.

SUMMARY OF THE INVENTION

According to a first aspect there is provided a vacuum cleaner comprising: a suction device; an extendable inlet nozzle in fluid communication with the suction device, the extendable inlet nozzle being extendable from a first operable position to a second operable position; a proximity sensor for detecting a surface; and a controller configured to change the suction power of the suction device in dependence on a signal from the proximity sensor and in dependence on the position of the extendable inlet nozzle.

The controller may be configured to change the suction power in response to the proximity sensor detecting that the distance to the surface has changed to be above or below a threshold distance, the threshold distance being variable and dependent on the position of the extendable inlet nozzle.

The controller may be configured to increase the suction power in response to the proximity sensor detecting a distance that is less than the threshold distance from the surface.

The suction device may be configured to operate in a high power mode or a low power mode in dependence on a signal from the proximity sensor and in dependence on the position of the extendable inlet nozzle.

The vacuum cleaner may further comprise a master switch operable by a user for switching the suction device on and off, the suction device being configured to operate in the low power mode or the high power mode when the master switch is on.

The vacuum cleaner may further comprise a battery configured to provide power to the suction device.

The vacuum cleaner may further comprise a nozzle position detector configured to determine the position of the extendable inlet nozzle.

The nozzle position detector may be a switch configured to be in a first state when the extendable inlet nozzle is in the first operable position and in a second state when the extendable inlet nozzle is in the second operable position.

The proximity sensor may be an infra-red sensor configured to determine a distance to the surface.

The infra-red sensor may be configured to emit a pulse of light and measure the intensity of the light reflected from the surface, the controller being configured to determine the distance to the surface in dependence on the measured intensity.

The infra-red sensor may be configured to emit a pulse of light and measure a time of flight of the light reflected from the surface, the controller being configured to determine the distance to the surface in dependence on the measured time of flight.

The vacuum cleaner may further comprise a user operable switch configured to cause the suction device to operate in a or the high power mode when actuated by the user.

The controller may be further configured to change the suction power in dependence on an accessory being attached to or detached from the extendable inlet nozzle.

According to a second aspect there is provided a method for a vacuum cleaner comprising a dirty air inlet, the method comprising: determining a position of the inlet; estimating a distance to a surface to be cleaned by the vacuum cleaner; and adjusting a suction power of the vacuum cleaner in dependence on the estimated distance to the surface and on the determined position of the inlet.

The inlet may be provided on an extendable nozzle or on an accessory that is detachable from the vacuum cleaner.

BRIEF DESCRIPTION OF THE DRAWINGS

The present invention will now be described by way of example with reference to the accompanying drawings. In the drawings:

e. FIG. 4*a* shows a simplified diagram of the nozzle in the non-extended position; and f. FIG. 4*b* shows a simplified diagram of the nozzle in the extended position.

DETAILED DESCRIPTION OF THE INVENTION

The following description is presented by way of example to enable a person skilled in the art to make and use the invention. The present invention is not limited to the embodiments described herein and various modifications to the disclosed embodiments will be apparent to those skilled in the art.

Figure 1:
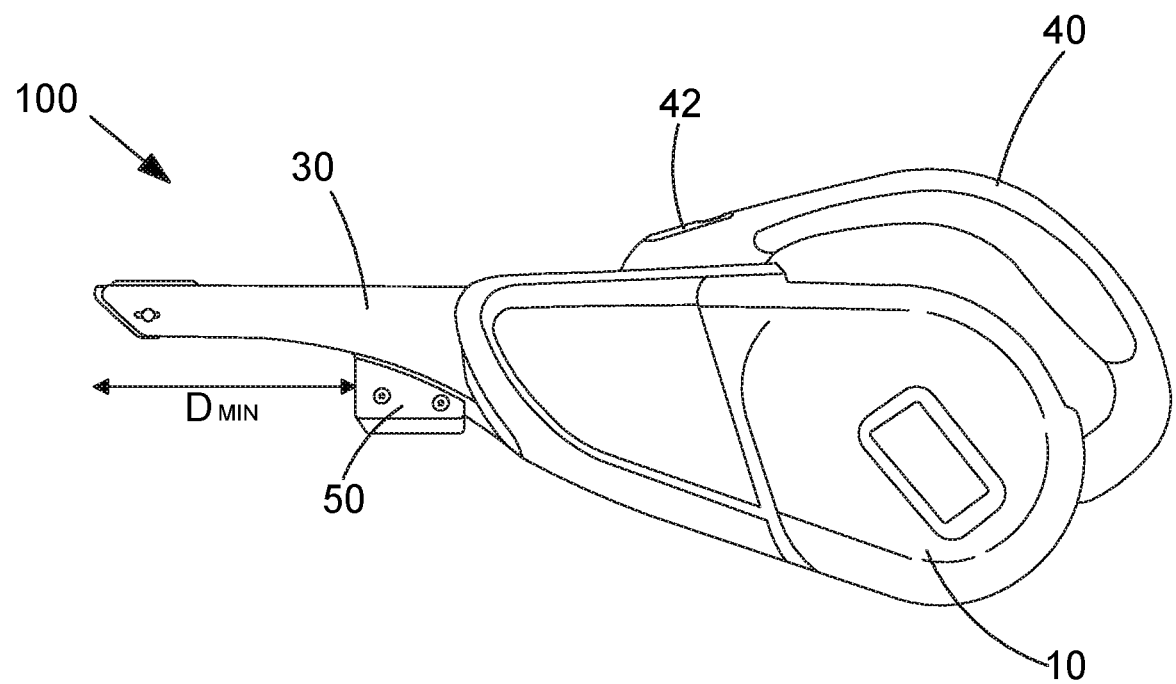
FIG. 1 shows a handheld vacuum cleaner.
Figure 1A:
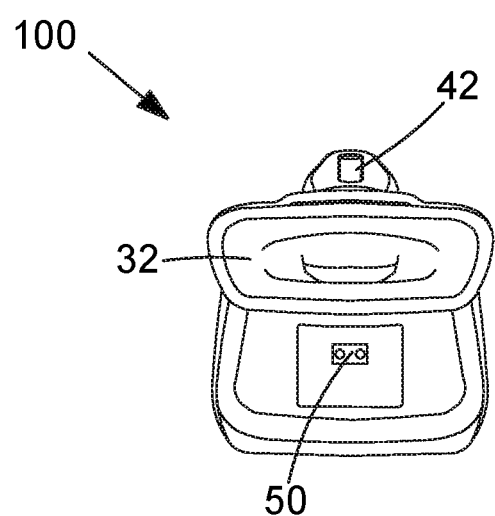
FIG. 1*a* shows a front view of the handheld vacuum cleaner.

FIG. 1 shows a side view of a hand-holdable vacuum cleaner 100 according to an embodiment of the invention and FIG. 1*a* shows a front view of the vacuum cleaner 100. The vacuum cleaner 100 comprises a main body 10, a collection chamber for dust and dirt (not shown), a rigid, elongate nozzle 30 and a handle 40. The nozzle 30 has an inlet 32 for dirty air located at one end thereof. Mounted on handle 40 is an electrical on-off switch 42 for operating a suction device such as an electric motor and fan arrangement (not shown) housed within main body 10. The switch 42 may have a first position for switching the motor off and a second position for switching the motor on. The switch 42 may have additional positions for other functions (such as causing operation in different modes, as discussed further below). The inlet 32 of nozzle 30 is in fluid communication with the suction device, which draws fluids (such as air or liquids) through the inlet 32. The vacuum cleaner may be powered by a battery (not shown) housed within main body 10.

Figure 2:
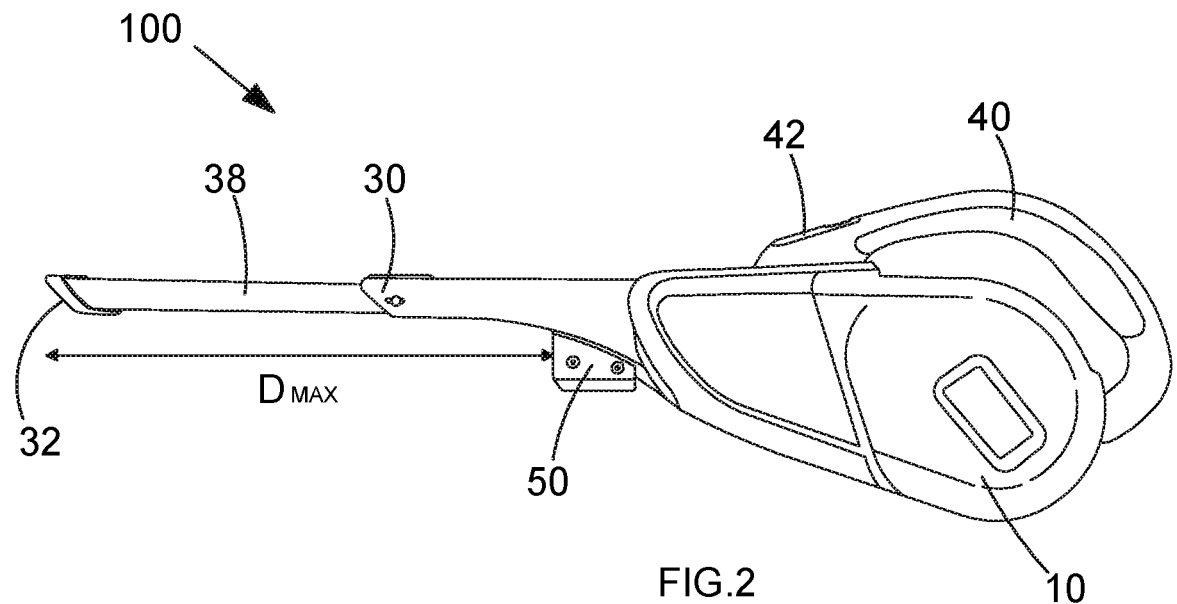
FIG. 2 shows the handheld vacuum cleaner with the nozzle extended.

As shown in FIG. 2, the elongate nozzle 30 is extendable. The nozzle 30 may comprise a rigid telescopic extension tube 38, which allows the nozzle 30 to be extendable. FIG. 2 shows the nozzle 30 extended to a maximum extended distance. The vacuum cleaner may be operable with the nozzle 30 at a non-extended position (shown in as FIG. 1) or at the maximum extend position (as shown in FIG. 2) or at any distance between the non-extended and maximum positions (not shown). The extendible nozzle 30 allows the user to extend the reach of the hand-holdable vacuum cleaner so that the user can vacuum hard to reach surfaces such as gaps between objects and surfaces above head height. The extendible nozzle 30 also extends the reach of the hand-held vacuum cleaner to allow the user to vacuum a floor surface in a more comfortable position.

Figure 3:
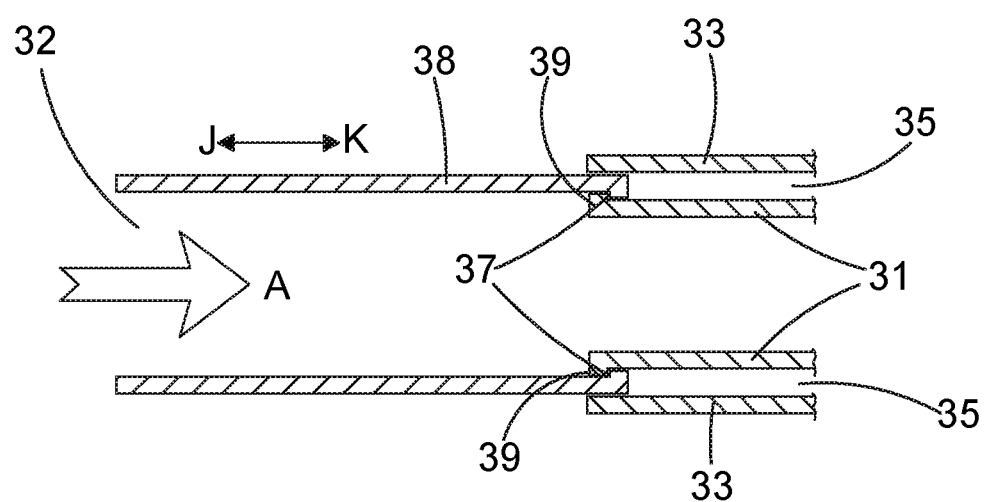
FIG. 3 shows a cross section of part of the nozzle.

FIG. 3 shows an embodiment in which the extendible nozzle 30 comprises the rigid telescopic extension tube 38, which dirty air enters in the direction indicated by arrow A during operation of the vacuum cleaner. In this embodiment, nozzle 30 comprises an inner tube 31 and an outer tube 33. Telescopic extension tube 38 can therefore slide within a space 35 provided between inner and outer tubes 31, 33 in the directions indicated by double-headed arrow J-K in FIG. 3, but is prevented from being removed from space 35 completely by end stops 37 which abut against corresponding lips 39 provided on inner tube 31. In this way, the overall length of nose 30 may be adjusted by a user by sliding extension tube 38 to a location where dirty air inlet 32 is positioned as required. Extension tube 38 may have a larger transverse cross-sectional area than inner tube 31. This decreasing cross-sectional area in the direction of the airflow during operation of the vacuum cleaner ensures that use of extension tube 38 does not cause a corresponding drop in air pressure. It is also beneficial for avoiding dirt becoming trapped at the interface between extension tube 38 and inner tube 31, in comparison to the converse arrangement, in which the cross sectional area of inner tube 31 would be larger than the cross-sectional area of extension tube 38.

The hand-holdable vacuum cleaner 100 comprises a proximity sensor 50 for detecting the surface to be cleaned by the vacuum cleaner (i.e., any surface that is in front of the inlet 32). The proximity sensor 50 is connected to a controller, which can receive information (via signals) from the proximity sensor 50. As shown in FIGS. 1 and 2, the proximity sensor 50 is positioned at the base of the nozzle 30 and below the elongated part of the nozzle 30. This allows the sensor 50 to emit signals to a surface in front of the nozzle 30 and receive reflections of those signals from the surface. In the example shown, where the proximity sensor 50 is positioned at the base of the nozzle and underneath the elongated part of the nozzle, emitted signals can travel along a path substantially parallel to the elongated part of the nozzle 30 and receive reflected signals that travel back along that same path. In other examples, the proximity sensor may be positioned elsewhere, e.g., near the front of the outer tube 33.

The proximity sensor 50 is capable of detecting a surface in front of the sensor. The proximity sensor 50 may also be capable of determining the distance between the detected surface and the sensor. The proximity sensor 50 may be an infra-red (IR) sensor. In one embodiment, the IR sensor may comprise an IR transmitter (such as an IR light emitting diode) and an IR detector. When the IR transmitter transmits a pulse of IR light, the IR detector measures the intensity of the reflection of that pulse off any surface in front of the sensor. The relationship between the reflected IR intensity and the distance to the surface may be pre-determined or pre-calibrated and so the distance between the proximity sensor and the surface to be vacuumed can be determined. In another embodiment, the time of flight of the IR pulse signal (rather than intensity) can be measured. The time of flight is proportional to the distance from the surface to be cleaned and so the distance between the proximity sensor and the surface to be vacuumed can be determined. Other known proximity sensors may also be used, such as ultrasonic sensors, radar, laser range-finders, etc.

The proximity sensor 50 can be used to determine when the inlet 32 is in close proximity to a surface to be vacuumed. This determination can be done by the proximity sensor 50 outputting information to the controller, which can process that output to determine the proximity of the inlet 32 to the surface. When it is determined that the inlet is close to the surface, the controller (not shown) can increase the suction of the suction device, e.g., to a high or maximum suction power. When it is determined that the inlet is not close to the surface (e.g., a distance that is too far to pick up dirt with the suction power of the vacuum cleaner), the controller can reduce the suction of the suction device, e.g., to a low standby or idling power or no suction. By reducing the suction power of the suction device when the inlet 32 is not close to the surface to be vacuumed, battery power can be saved in comparison with leaving the suction device running at high or maximum speed.

The controller is capable of determining when the surface to be cleaned is close to the inlet 32 based on the distance measured by the proximity sensor 50 and based on the position of the inlet 32 of nozzle 30. When the nozzle 30 is not extended (as shown in FIG. 1), the inlet 32 is at a minimum distance "Dmin" from the proximity sensor 50. When the nozzle 30 is extended to it's maximum extension (as shown in FIG. 2), the inlet 32 is at a maximum distance "Dmax" from the proximity sensor 50. The controller may be configured to increase the suction of the vacuum cleaner when the proximity sensor determines that surface to be cleaned is at a distance that is less than a threshold distance. The controller may be configured to decrease the suction of the vacuum cleaner when the proximity sensor determines that surface to be cleaned is at a distance that is greater than a threshold distance. The controller may be configured to change the threshold distance depending on a determination of the position of inlet 32. For example, when the nozzle 30 is not extended, the controller may set the threshold distance to be Dmin plus a small distance x (Dmin+x). When the user moves the vacuum cleaner towards a surface to be cleaned and the proximity sensor 50 detects a surface that is at a distance of less than or equal to Dmin+x, the controller will increase the suction power of the vacuum cleaner. When the user then lifts the vacuum cleaner away from the surface and the proximity sensor 50 detects that the surface is at a distance of greater than Dmin+x, the controller will decrease the suction power of the vacuum cleaner.

The user may then extend nozzle 30. This change in position of the nozzle is detected (as described below), which causes the controller to change the threshold distance to be Dmax plus a small distance x (Dmax+x). Similarly, when the user moves the vacuum cleaner with the extended nozzle towards a surface to be cleaned and the proximity sensor 50 detects a surface that is at a distance of less than or equal to Dmax+x, the controller will increase the suction power of the vacuum cleaner. When the user then lifts the extended-nozzle vacuum cleaner away from the surface and the proximity sensor 50 detects that the surface is at a distance of greater than Dmax+x, the controller will decrease the suction power of the vacuum cleaner. Thus, the power-saving feature of only providing high suction when the inlet 32 is close to a surface is operable whether the nozzle is in a non-extended or extended position. Small distance x is implementation specific and may be predetermined based on a number of factors such as the suction power of the vacuum cleaner.

The controller may determine the position of the nozzle via a manual user input or automatically. For example, the vacuum cleaner may be provided with a user switch which can be triggered by the user to change the threshold distance setting depending on the whether the nozzle is extended or not. Preferably, the threshold distance setting is changed automatically. FIG. 4a shows a simplified example of an automatic threshold setting arrangement, which uses a switch 60 that is positioned at the end of the telescopic extension tube 38 that is opposite to the inlet 32 end (i.e., the end where the end stops 37 are located). The switch 60 is connected to the controller so that it can send a signal to the controller indicating which state the switch is in. When the telescopic extension tube 38 is in the non-extended position (as shown in FIG. 4a) the end stop 37 end can abut against the switch 60 to actuate it. The controller is able to determine that the switch is in the actuated state and so it is determined that the nozzle 30 is in the non-extended position and thus the controller sets the threshold distance to be Dmin+x. When the telescopic extension tube 38 is in the extended position (as shown in FIG. 4b) the end stop 37 end no longer abuts against the switch 60 and so the switch is in an open-circuit state. The controller determines that the switch is in the open circuit state and so it is determined that the nozzle 30 is in the extended position and thus the controller sets the threshold distance to be Dmax+x.

In another example, the automatic threshold setting may be performed using a second proximity sensor (not shown), which can determine the distance that the nozzle 30 has been extended. The second proximity sensor may be used instead of or in conjunction with switch 60. The second proximity sensor (not shown) may be positioned such that it can detect the position of the end stop 37 end along space 35. This allows the second proximity sensor to determine the distance that the telescopic extension tube 38 is extended by. The distance detected by the second proximity sensor is provided to the controller, which can adjust the threshold distance in accordance with the detected distance. Thus, the threshold distance can be adjusted in accordance with any length of extension of the telescopic extension tube 38 within the Dmin and Dmax range. Accordingly, the suction power can be adjusted when the distance detected by the proximity sensor 50 has crossed above or below the threshold distance, which has been set in dependence on distance detected by the second proximity sensor. In an example, the second proximity sensor may be an IR sensor that is capable of transmitting an IR signal towards the end stop 37 end of the telescopic extension tube 38. The IR sensor detects the reflections of the IR signal off the end stop end 37 to determine the position of the telescopic extension tube. The transmitted and reflected IR signals may travel along the free space path 35 when the telescopic extension tube 38 is in an extended position.

The suction device may be configured to operate in a plurality of power modes to provide varying levels of suction power. For example, the suction device may operate in a high power mode (which may be a maximum power setting for the suction device) to provide a high level of suction. The suction device may operate in a low power mode, in which the suction device provides a low or negligible amount of suction or no suction. The suction device consumes battery power at a greater rate in the high power mode than in the low power mode. When the distance to the surface detected by proximity sensor 50 is greater than the threshold distance, the controller causes the suction device to enter the low power mode. Although a low power mode that provides no suction will consume less power than providing a low or negligible amount of suction, the inventors have found that it may be preferable to keep the suction device running in a low power idling state as, in this state, the suction device creates a low level noise and/or vibration, which the user can hear or feel to usefully indicate to the user that the vacuum cleaner is in a ready-to-operate, standby state rather than being switched off and non-operable. Furthermore, the lifetime of the suction device can be increased by reducing the power of the suction device to a low level instead of switching it off completely because repetitive switching the power on and off can damage the motor of the suction device. In addition, starting a motor from a dead-start requires a large amount of energy and so by increasing the suction power from a low level instead of from a dead-start, the amount of energy used over a period of time can be lower when there are frequent increases of suction energy.

As mentioned above, the vacuum cleaner may comprise an electrical on-off switch 42, which may be a master switch that causes the components of the vacuum cleaner to receive electrical power or not from the battery. Preferably, when the user actuates switch 42 to turn the vacuum cleaner on, the controller causes the suction device to enter the low power mode, which may be the default power mode for the suction device. The controller may then cause the suction device to enter the high power mode when the inlet 32 is placed close a surface to be vacuumed (as described above). Thus, when switch 42 is on, the vacuum cleaner can alternate between the high power and low power modes depending on the proximity of the inlet 32 to the surface to be vacuumed. When the user has finished vacuuming, he may then turn the switch 42 off so that the vacuum cleaner is no longer powered or operable.

The vacuum cleaner may be couplable to an accessory, such as a floor extension nozzle. The accessory usually has one end with a dirty air inlet and another end that has an opening that couples to nozzle 30 of the vacuum cleaner. The vacuum cleaner may be provided with a switch or sensor that can detect when the accessory is coupled to nozzle 30. In response to such a detection, the controller may be configured to cause the suction device to operate in the high power mode only, regardless of any detection by proximity sensor 50. Thus, effectively, the controller disables the proximity sensor when the accessory is attached to the nozzle 30. When the accessory is detached from the nozzle 30, the controller may return to the previous operation of changing the suction power based on the distance detected by the proximity sensor 50. This allows different types of accessories to be attached to the nozzle 30 and prevents false readings from the proximity sensor caused by reflections off the accessory causing the suction power to be changed incorrectly.

In some cases, the proximity sensor may provide false readings. For example, in the case that the proximity sensor is an IR sensor, very dark matt black surfaces may affect the reflection of the IR pulse and thus provide a false reading. To overcome this issue, the vacuum cleaner may comprise a user switch or button which overrides the proximity sensor to operate the suction device in the high power mode. In another example, the override could be integrated into switch 42, where the user holds the switch at a certain position for a short period to give a period of high power suction.

The suction device may be configured to operate at other power levels in addition to the high and low power levels mentioned above. For example, the suction device could operate at any power level between its maximum power suction and no power. The controller may select an appropriate power level in dependence on the distance measured by the proximity sensor. For example, as the user moves the vacuum cleaner closer to the surface to be cleaned (and thus the proximity sensor detects a decreasing distance), the controller may cause the suction power to gradually increase towards the high power level.

The invention may be implemented in vacuum cleaner types other than hand-holdable vacuum cleaners. The invention may also be implemented in upright, stick, cylinder and robotic vacuum cleaner types. For example, various types of vacuum cleaners are usually provided with a hose for receiving various accessories, the hose being in fluid connection with the suction device. A proximity sensor may be positioned on an end portion of a hose. The controller may determine the type of accessory attached that is attached to the hose (e.g., via known methods) and, using predetermined stored information, determine the position of the inlet for that accessory. The controller may then adjust the threshold distance for the inlet of that particular accessory and perform the suction power control described above using the proximity sensor on the end portion of the hose.

The inventors have found that during a typical vacuuming operation, reducing the suction power when the inlet is not near a surface (as described herein) can double the battery life compared to leaving the suction device running at high power. In a study by the inventors, it was found that when people use their handheld vacuum cleaners, they switch it on and move to the area to be cleaned (which takes 5 seconds), clean for 5 seconds, then walk to the next area (which takes 5 seconds). So in a cycle, there is an average of 5 seconds of cleaning and 10 seconds non-cleaning. By reducing the suction power during the non-cleaning portions of the cycle using the proximity sensing described above, the run-time of the vacuum cleaner doubled compared to vacuum cleaners that do not reduce the suction power. The invention allows the battery saving to be realised regardless of the position of the inlet or the accessory used with the vacuum cleaner. The invention can also increase the user convenience of using a handheld vacuum cleaner. In some cases, users of handheld vacuum cleaners only vacuum certain dirty spots in a room (rather than the whole room) and when they finish vacuuming in one spot, they switch off the vacuum cleaner, move to the next spot and then switch the vacuum cleaner on again. The present invention allows the vacuum cleaner to be powered down when the user is moving from spot to spot (as the inlet will not be near enough to a surface when the user is moving to another area) and so the user does not have to regularly and repetitively switch the vacuum cleaner off and on. In addition, the vacuum cleaner reduces the amount of noise generated during a typical vacuuming operation because it powers down automatically when it is not near a surface to be cleaned.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A vacuum cleaner comprising:
a suction device;
an extendable inlet nozzle in fluid communication with the suction device, the extendable inlet nozzle being extendable from a first operable position to a second operable position;
a proximity sensor for detecting a surface; and
a controller configured to change the suction power of the suction device in dependence on a signal from the proximity sensor and in dependence on the position of the extendable inlet nozzle.

2. A vacuum cleaner as claimed in claim 1, wherein the controller is configured to change the suction power in response to the proximity sensor detecting that the distance to the surface has changed to be above or below a threshold distance, the threshold distance being variable and dependent on the position of the extendable inlet nozzle.

3. A vacuum cleaner as claimed in claim 2, wherein the controller is configured to increase the suction power in response to the proximity sensor detecting a distance that is less than the threshold distance from the surface.

4. A vacuum cleaner as claimed in claim 2, wherein the suction device is configured to operate in a high power mode or a low power mode in dependence on the signal from the proximity sensor and in dependence on the position of the extendable inlet nozzle.

5. A vacuum cleaner as claimed in claim 4, further comprising a master switch operable by a user for switching the suction device on and off, the suction device being configured to operate in the low power mode or the high power mode when the master switch is on.

6. A vacuum cleaner as claimed in claim 1, further comprising a battery configured to provide power to the suction device.

7. A vacuum cleaner as claimed in claim 1, further comprising a nozzle position detector configured to determine the position of the extendable inlet nozzle.

8. A vacuum cleaner as claimed in claim 7, wherein the nozzle position detector is a switch configured to be in a first state when the extendable inlet nozzle is in the first operable position and in a second state when the extendable inlet nozzle is in the second operable position.

9. A vacuum cleaner as claimed in claim 1, wherein the proximity sensor is an infra-red sensor configured to determine a distance to the surface.

10. A vacuum cleaner as claimed in claim 9, wherein the infra-red sensor is configured to emit a pulse of light and measure the intensity of the light reflected from the surface, the controller being configured to determine the distance to the surface in dependence on the measured intensity.

11. A vacuum cleaner as claimed in claim 9, wherein the infra-red sensor is configured to emit a pulse of light and measure a time of flight of the light reflected from the surface, the controller being configured to determine the distance to the surface in dependence on the measured time of flight.

12. A vacuum cleaner as claimed in claim 1, further comprising a user operable switch configured to cause the suction device to operate in a low power mode or a high power mode when actuated by the user.

13. A vacuum cleaner as claimed in claim 1, wherein the controller is further configured to change the suction power in dependence on an accessory being attached to the extendable inlet nozzle.

14. A method for vacuuming comprising:
providing a vacuum cleaner with a dirty air inlet;
determining a position of the inlet;
determining a distance to a surface to be cleaned by the vacuum cleaner; and
adjusting a suction power of the vacuum cleaner in dependence on the distance to the surface and the position of the inlet.

15. The method of claim 14, wherein the inlet is provided on an extendable nozzle or on an accessory that is detachable from the vacuum cleaner.

16. The method of claim 14, wherein the distance to the surface to be cleaned is determined by a proximity sensor.

* * * * *